(12) United States Patent
Poncelet

(10) Patent No.: US 6,468,492 B2
(45) Date of Patent: Oct. 22, 2002

(54) METHOD TO PREPARE AN ALUMINOSILICATE POLYMER

(75) Inventor: Olivier J. Poncelet, Chalon sur Saone (FR)

(73) Assignee: Eastman Kodak Company, Rochester, NY (US)

( * ) Notice: Subject to any disclaimer, the term of this patent is extended or adjusted under 35 U.S.C. 154(b) by 100 days.

(21) Appl. No.: 09/754,582

(22) Filed: Jan. 4, 2001

(65) Prior Publication Data

US 2002/0085972 A1 Jul. 4, 2002

(51) Int. Cl.$^7$ ................................................ C01B 33/26
(52) U.S. Cl. .................. 423/328.1; 423/330.1
(58) Field of Search ................. 423/328.1, 330.1, 423/327.1

(56) References Cited

U.S. PATENT DOCUMENTS

| | | |
|---|---|---|
| 4,152,404 A | 5/1979 | Farmer |
| 4,252,779 A | 2/1981 | Farmer |
| 5,888,711 A | 3/1999 | Poncelet et al. |
| 5,972,831 A | * 10/1999 | Poncelet et al. ............ 502/304 |

FOREIGN PATENT DOCUMENTS

| | | |
|---|---|---|
| EP | 0 895 965 A | 2/1999 |
| FR | 2 385 646 A | 10/1978 |
| FR | 2 740 466 A | 4/1997 |
| FR | 2 767 128 A | 2/1999 |
| GB | 2 025 384 A | 1/1980 |
| WO | 96 13459 A | 5/1996 |

OTHER PUBLICATIONS

S. M. Barrett et al., "The Synthesis and Characterization of Imogolite", 1991, vol. 27, No. 7, pp. 609–612.
S. I. Wada et al., "Synthetic Allophane and Imogolite", 1979, abstract.

* cited by examiner

*Primary Examiner*—Stanley S. Silverman
*Assistant Examiner*—Christina Ildebrando
(74) *Attorney, Agent, or Firm*—Chris P. Konkol

(57) ABSTRACT

The invention relates to a method to prepare an aluminosilicate polymer of the imogolite type. The method consists in treating an aluminium halide, with an alkyl orthosilicate, with an aqueous alkali in the presence of glass or silica particles, letting the mixture ripen at ambient temperature, and then heating it at 96–98° C. for long enough for the reaction to go to completion. The conditions of synthesis of the aluminosilicate polymer are thereby improved.

8 Claims, 1 Drawing Sheet

METHOD TO PREPARE AN ALUMINOSILICATE POLYMER

FIELD OF THE INVENTION

This invention concerns a method to prepare an aluminosilicate polymer, and the use of the polymer obtained by said method in the treatment of photographic processing effluents.

BACKGROUND OF THE INVENTION

Aluminosilicate polymers are known. A filamentous tubular crystallized aluminosilicate designated imogolite occurs naturally in volcanic ash. U.S. Pat. Nos. 4,152,404 and 4,252,779 describe the synthetic preparation of substances related to imogolites. U.S. Pat. No. 5,888,711 describes a method to obtain directly a fibrous aluminosilicate polymer of high purity of formula $Al_xSi_yO_z$, where x:y is 1 to 3 and z is from 1 to 10. A variant of this method that affords a morphological variety of this aluminosilicate polymer is described in French Patent application 2 767 128.

SUMMARY OF THE INVENTION

The object of this invention is an improvement of the synthesis of aluminosilicate polymers as described in U.S. Pat. No. 5,888,711 or French Patent 2 767 128, whereby these polymers are obtained faster, more simply, and at lower cost.

The method of the invention, to prepare an imogolite-type aluminosilicate polymer, comprises the following steps:

(a) A mixed aluminium-silicon alkoxide, or a precursor of a mixed aluminium-silicon compound is treated with an aqueous alkali at a pH of between 4.5 to 6.5, keeping the molar concentration of aluminium between $5\times10^{-4}$ and $10^{-2}$ and the Al/Si molar ratio between 1 and 3.

(b) The mixture obtained in step (a) is heated at a temperature lower than 100° C. for sufficient time for the reaction to go to completion.

(c) The residual ions are removed from the mixture obtained in step (b).

This method is characterized in that step (a) is carried out in the presence of silanol groups, and in that after step (a) and before step (b) ripening step at ambient temperature is included.

DETAILED DESCRIPTION OF THE INVENTION

Figure 1:
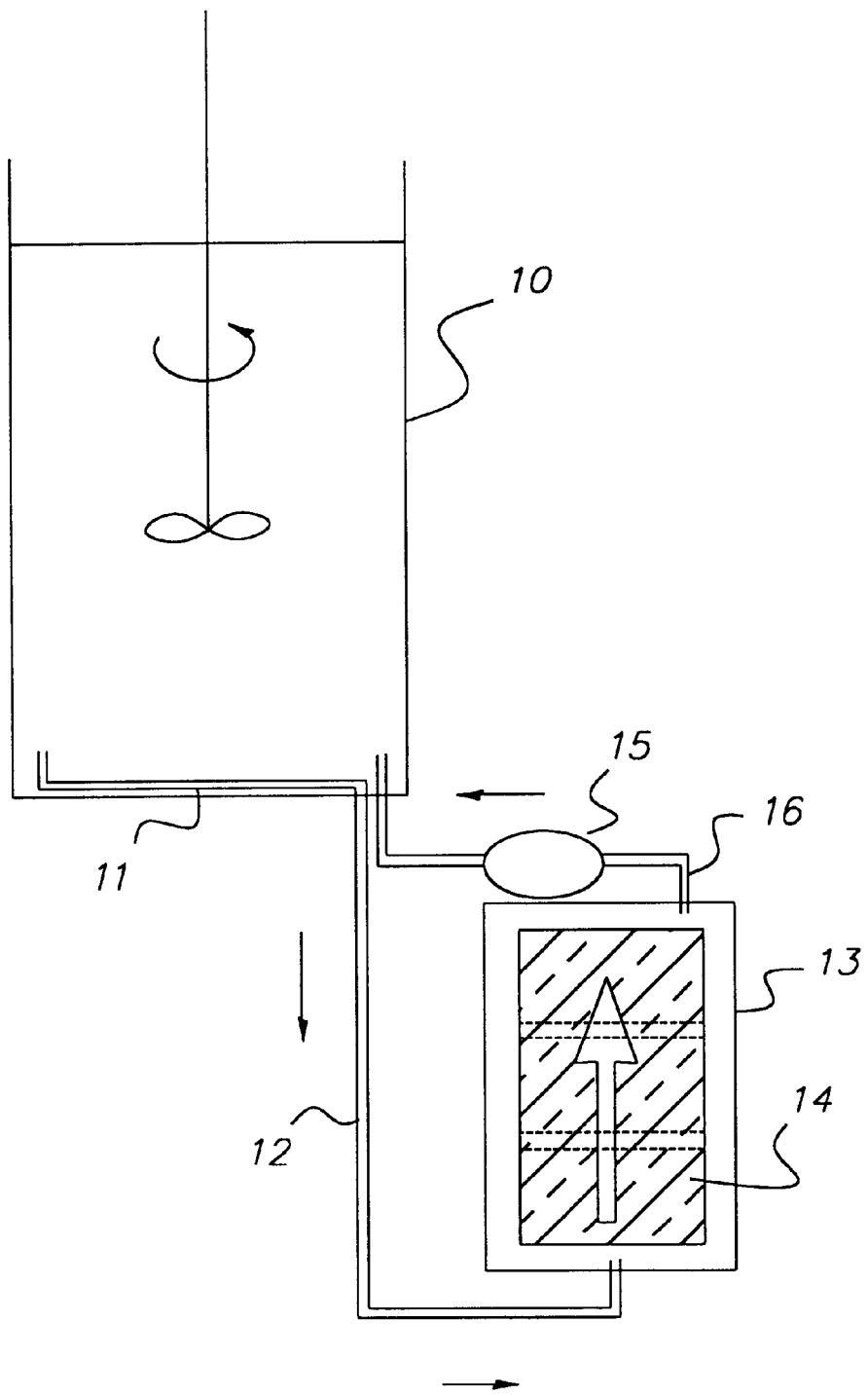
FIG. 1 is a schematic depiction of a device designed to perform step (a) of the method according to the invention.

According to one embodiment a mixed aluminium-silicon precursor is formed by hydrolyzing (i) an aluminium salt, an aluminium haloalkoxide, or a mixture of such compounds, and (ii) an silicium alkoxide or chloroalkoxide, in acid conditions (Ph 2–3). Preferably, an aluminium salt such as a halide (e.g., chloride or bromide), a perhalogenate, a sulfate, a nitrate, a phosphate or a carboxylate, and a silicon alkoxide that is a methoxide or an ethoxide, for example, a tetramethyl or tetraethyl orthosilicate, can be used. The hydrolysis is carried out at ordinary temperature between 15 and 35° C., preferably between 20 and 25° C., by adding the silicon alkoxide to the aluminium salt in aqueous solution, and then adding an aqueous alkali, sodium or potassium hydroxide.

The precursor is thereby obtained. According to a preferred embodiment, the aluminium salt, e.g. $AlCl_3,6H_2O$ is added to water and allowed to stand 10:30 minutes at room temperature. The pH of the solution is about 2. Then a silicium compound e.g. a silicium alkoxide, is added to the solution. The pH of the reaction mixture is still about 2. Then, an alkali is added to obtain the precursor.

The precursor can also be formed by mixing a silicon alkoxide or chloroalkoxide with an aluminium chloralkoxide. In this procedure, as in the one above, the alkoxyl radical preferably contains from 1 to 5 atoms of carbon, such as methoxide, ethoxide, n-propoxide, or i-propoxide.

To the precursor is then added an aqueous alkali to get a pH between 4.5 and 6.0, preferably between 5.0 and 5.5, while maintaining the concentration of Al between $5\times10^{-4}$ M and $10^{-2}$ M and the Al/Si molar ratio between 1 and 3. The aluminium concentration is advantageously set between $5\times10^{-3}$ and $7\times10^{-3}$. According to another embodiment, the alkali takes the form of a water-ethanol solution. An aqueous solution of sodium or potassium hydroxide with a concentration between 2 M and $10^{-2}$ M and advantageously between 0.1 M and 1 M is preferably used. When the alkali is added, an hydrolysis takes place and the polymeric aluminosilicate precipitates as a gel. This precipitate is collected by filtration and redissolved in acid medium to yield a limpid solution with a pH between about 3.8 and 4.5. This solution is then diluted to obtain an Al+Si content of between 0.3 and 0.8 g/l. The solution is then ready for the heating step (b).

The invention comprises the feature in that step (a) of the process, i.e. the preparation and hydrolysis of the precursor, or the hydrolysis of the mixed alkoxide, is carried out in the presence of silanol groups (SiOH). These groups can in particular be provided by silica particles or beads, which possess hydroxy groups at their surface. When the volume of liquid to be treated is large it may be desirable to increase the quantity of beads. The diameter of the beads can be between 0.2 and 5 mm and preferably between 1 and 3 mm. The optimal diameter is selected so as to afford optimal percolation of the liquid with minimal head loss.

The method of the invention comprises further the feature that the hydrolysis of step (a) is followed by ripening at ordinary temperature. This ripening operation is carried out in simple containers or open tanks made of plastic or any other inert material. The ripening requires no immobilization of any reactor. The ripening time is at least 5 days. This time allows the time required for step (b) to be considerably reduced.

Step (b) of the method of the invention consists in heating the product of the hydrolysis and the ripening at a temperature lower than 100° C. for long enough for the reaction to go to completion. Without ripening this takes several days, during which time the reactor is immobilized. With the ripening step according to the invention the time required for the heating step can be reduced to 24 hours and even to 12 hours, while retaining a high yield of Al+Si in the final product. This heating step is carried out preferably in an inert reactor, for example made of stainless steel, ceramic or an enameled material. The inside walls of the reactor must be clean and in particular free of any substances or nuclei that favor the growth of aluminium oxides.

According to one embodiment, the heating is performed at 96–98° C. for 24 hours. The heating step can also be carried out in the presence of silanol groups in the form of glass or silica beads analogous to those of step (a). This heating is assumed to favor a condensation resulting in the formation in solution of an aluminosilicate polymer of the imogolite type. This assumption does not restrict the scope of the invention. Indications concerning this step in the process are given in U.S. Pat. No. 5,888,711.

According to one embodiment, after the heating step the solution can be concentrated by any appropriate method, for example by ultrafiltration or centrifuging, so as to obtain a solution of concentration between about 1 and 5 g/l. The solution can also be allowed to settle, and the least dense phase collected. This phase consists of a spindle-shaped variety of an aluminosilicate polymer of the imogolite type that possesses improved antistatic properties. This embodiment is described in European Patent application 895 965.

According to another embodiment, a stable solid gel can be obtained by addition of an alkali to the solution of the aluminosilicate polymer. For example, ammonia can be added to the solution to obtain a pH of about 8.

According to another embodiment the aluminosilicate polymer can be modified by grafting onto its surface functions such as SH or —S($CH_2$)$_n$—S— where n is in the range 0 to 4. This grafting is performed by hydrolyzing an alkylalkoxysilane comprising an SH or —S—($CH_2$)$_n$—S— function in the presence of the aluminosilicate polymer.

The aluminosilicate polymers obtained according to the method of the invention are particularly useful for the extraction of metal cations or organic pollutants from aqueous effluents. Such extraction is highly advantageous for the depollution of effluents from photographic processing, such as developing, bleaching or fixing baths, or washing water from such processing.

EXAMPLE 1

In a 300-liter reactor (10) made of enameled stainless steel depicted schematically in FIG. 1 was placed 100 liters of osmosed water, followed by 369 g of $AlCl_3$, $6H_2O$ (1.53 mole). The solution was allowed to stand 30 minutes at room temperature then, 129 g of tetramethyl orthosilicate (1.11 mole) were added. The resulting clear solution was stirred for 30 minutes. To this reactor, as shown in FIG. 1, was fitted a circuit comprising an outlet (11) connected by piping (12), and a cartridge (13) loaded with 200 g of glass beads (14) of diameter 2 mm (Prolabo). The cartridge (13) was connected by piping (16) to a pump (15) with a flow rate of 10 liters/minute that sent the liquid back to the reactor (10). To the contents of the reactor were added 3.5 liters of 1M NaOH in 1 hour 30 minutes. The reaction medium became cloudy. The mixture was stirred for 3 hours. The mixture became clear. The pump was then disconnected and 1.060 liters of IM NaOH then added in 1 hour. A white precipitate formed, which was allowed to settle overnight. The supernatant was then decanted. The Al+Si content of the precipitate measured by inductively coupled plasma (ICP) assay was 2.5 g/l.

To the precipitate was added 0.6 liters of a 50:50 mixture by volume of 1M HCl and 2M $CH_3CO_2H$. The mixture was stirred for 6 hours. It became clear and its pH was 4.0. This mixture was then diluted with osmosed water to obtain an Al+Si content of 0.35 g/l.

The diluted mixture was left to stand in a container made of inert plastic material (polypropylene) for 10 days at ambient temperature (about 20° C.). This step is the ripening described above.

The mixture was then heated at 96° C. with stirring for 24 hours in a stainless steel reactor.

The reaction mixture was then concentrated by ultrafiltration through an Amicon 100K (polyethersulfone) membrane. The yield of imogolite, calculated in terms of Al+Si was 15 kg of 3 g/l solution (87%).

EXAMPLE 2

The procedure of Example 1 was repeated except that the ripening step was not performed. The final yield of Al+Si was less than 40%.

EXAMPLE 3

The procedure of Example 1 was repeated, except that glass beads were not used in step (a). Instead, the same amount of glass beads was placed in the reactor in which the solution was heated. A heterogeneous mixture of imogolite and boehmite was obtained ($Al_2O_3$).

The invention has been described in detail with particular reference to certain preferred embodiments thereof, but it will be understood that variations and modifications can be effected within the spirit and cope if the invention.

I claim:

1. A method to obtain an aluminosilicate polymer of the imogolite type, comprising the steps of:

(a) contacting a mixed aluminium-silicon alkoxide or a precursor of a mixed aluminium-silicon compound with an aqueous alkali at a pH of from 4.5 to 6.5, keeping the molar concentration of aluminium between $5 \times 10^{-4}$ and $10^{-2}$ M, and the Al/Si molar ratio between 1 and 3;

(b) heating the mixture obtained in step (a) at a temperature below 100° C. for a time sufficient to have a complete reaction to obtain the aluminosilicate polymer: and (c) removing residual ions from the polymer obtained in step (b), wherein step (a) is carried out in the presence of silanol groups, and in that after step (a) and before step (b), a ripening step at room temperature is carried out.

2. The method of claim 1 wherein step (b) is also carried out in the presence of silanol groups.

3. The method of claim 1 wherein the silanol groups are provided in the form of silica or glass beads.

4. The method of claim 1, wherein said precursor of a mixed aluminium-silicon compound is a product of the hydrolysis (i) of a compound selected from the group consisting of aluminium salts and aluminium haloalkoxides, and (ii) a compound selected from the group consisting of silicon alkoxides and chloroalkoxides.

5. The method of claim 1 wherein the duration of said ripening step is in the range 5 to 15 days.

6. The method of claim 1 wherein said precursor of a mixed aluminium-silicon compound is the result of the reaction of (i) an aluminium halide and (ii) a silicon alkoxide.

7. The method of claim 6, wherein said precursor is obtained by adding an aluminium salt to water, then adding a silicon alkoxide, and then adding an alkali.

8. The method of claim 1 wherein glass or silica beads 0.2 to 5 mm in diameter are used in step (a).

* * * * *